(12) United States Patent
Swinehart

(10) Patent No.: US 12,155,547 B2
(45) Date of Patent: Nov. 26, 2024

(54) SYSTEM AND METHOD FOR MONITORING NETWORK CONNECTIVITY ASSOCIATED WITH INTERNET SERVICE PROVIDERS

(71) Applicant: Kenneth D. Swinehart, Creede, CO (US)

(72) Inventor: Kenneth D. Swinehart, Creede, CO (US)

( * ) Notice: Subject to any disclaimer, the term of this patent is extended or adjusted under 35 U.S.C. 154(b) by 413 days.

(21) Appl. No.: 17/501,538

(22) Filed: Oct. 14, 2021

(65) Prior Publication Data

US 2022/0116295 A1   Apr. 14, 2022

Related U.S. Application Data

(60) Provisional application No. 63/091,400, filed on Oct. 14, 2020.

(51) Int. Cl.
| | |
|---|---|
| *H04W 56/00* | (2009.01) |
| *G08B 5/36* | (2006.01) |
| *H04L 43/0817* | (2022.01) |
| *H04L 43/0882* | (2022.01) |
| *H04L 43/10* | (2022.01) |

(52) U.S. Cl.
CPC ............ *H04L 43/0817* (2013.01); *G08B 5/36* (2013.01); *H04L 43/0882* (2013.01); *H04L 43/10* (2013.01)

(58) Field of Classification Search
CPC . H04L 43/0817; H04L 43/0882; H04L 43/10; H08B 5/36
USPC ........................................................ 370/252
See application file for complete search history.

(56) References Cited

U.S. PATENT DOCUMENTS

| | | | |
|---|---|---|---|
| 6,654,914 B1 | 11/2003 | Kaffine et al. | |
| 6,968,513 B1* | 11/2005 | Rinebold | G06Q 30/02 |
| | | | 715/854 |
| 7,983,174 B1 | 7/2011 | Monaghan et al. | |
| 9,356,829 B1 | 5/2016 | Zeldin et al. | |
| 11,587,384 B1* | 2/2023 | Lemmon | G06Q 20/20 |
| 11,810,155 B1* | 11/2023 | Gilbert | G06Q 30/0254 |
| 2006/0195891 A1 | 8/2006 | Freyman et al. | |
| 2007/0094168 A1* | 4/2007 | Ayala | G06N 3/105 |
| | | | 706/15 |
| 2008/0133979 A1 | 6/2008 | Lee et al. | |
| 2009/0276771 A1* | 11/2009 | Nickolov | G06Q 30/04 |
| | | | 718/1 |
| 2011/0255396 A1* | 10/2011 | Altland | H02J 13/0005 |
| | | | 370/216 |
| 2011/0280134 A1 | 11/2011 | Zheng | |
| 2013/0173965 A1 | 7/2013 | Son et al. | |

(Continued)

*Primary Examiner* — Sai Ming Chan
(74) *Attorney, Agent, or Firm* — Lee & Hayes, P.C.

(57) ABSTRACT

An electronic device may be connected (e.g., via an ethernet cable) to a router and/or an internet service provider (ISP) equipment at a user's location to monitor and/or test a connectivity status of a network being provided at the user's location. The electronic device may include lights that guide the user to determine by visual representations if their network connection is operational and/or whether the connection meets minimum functionality for various applications that run over the network connection, such as voice over (VO) IP and/or video-conferencing. In some cases, the electronic device may include a testing component capable of pinging one or more nodes (e.g., routers, testing servers, diagnostic logging servers, etc.) in order to determine a source of a connectivity issue (e.g., outage).

20 Claims, 8 Drawing Sheets

(56) References Cited

U.S. PATENT DOCUMENTS

| | | |
|---|---|---|
| 2013/0281025 A1* | 10/2013 | Reunamaki ............. H04L 67/75 |
| | | 455/39 |
| 2014/0101232 A1 | 4/2014 | Harhi |
| 2014/0237107 A1 | 8/2014 | Ince et al. |
| 2016/0021555 A1 | 1/2016 | Di Cioccio et al. |
| 2016/0323171 A1 | 11/2016 | Stokking et al. |
| 2017/0256119 A1* | 9/2017 | Abdelmalak .......... G06Q 20/18 |
| 2017/0257226 A1 | 9/2017 | Bi |
| 2017/0331707 A1 | 11/2017 | Grinkemeyer |
| 2018/0295529 A1* | 10/2018 | Jen ........................ H04W 24/04 |
| 2018/0309627 A1 | 10/2018 | Yarbrough et al. |
| 2020/0238928 A1* | 7/2020 | Sandu ..................... H04L 12/40 |

* cited by examiner

SYSTEM AND METHOD FOR MONITORING NETWORK CONNECTIVITY ASSOCIATED WITH INTERNET SERVICE PROVIDERS

CROSS-REFERENCE TO RELATED APPLICATION(S)

This application claims priority to U.S. Provisional Application No. 63/091,400, filed on Oct. 14, 2020 and entitled "System And Method For Monitoring Network Connectivity Associated With Internet Service Providers," the entirety of which is incorporated herein by reference.

BACKGROUND

Through the proliferation of network connectivity access throughout the world, more people than ever before use the internet to watch television, play video games, shop online, read the news, etc. When a typical consumer experiences an interruption in internet service, they may call their provider to identify the problem. However, when an outage is large, or the service provider is small, customers may wait for hours on the phone waiting to talk to technical support personnel. Being unaware of the cause of the outage, customers may attempt to correct the problem themselves, (e.g., disconnect cables, reset buttons, etc.), which may not be necessary and may cause additional problems to their network connectivity. For example, in some cases, cables may not be re-connected correctly, or an internet protocol (IP) address assigned to the customer may get reset to a default address. Thus, there is a need to quickly and accurately determine a cause of a network connectivity disruption and to inform an affected customer of the cause.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
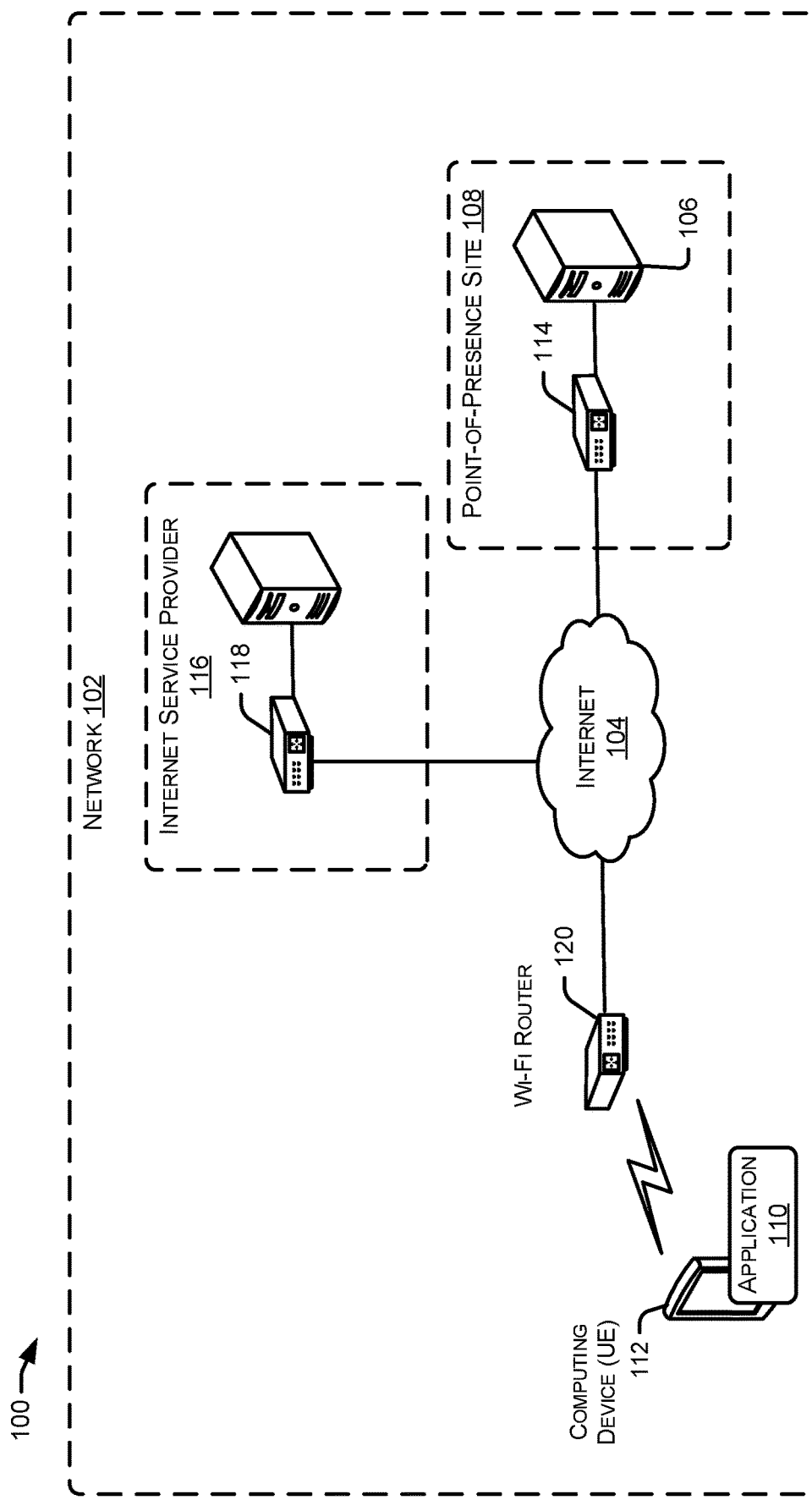
FIG. 1 is a block diagram showing an illustrative environment for network connectivity monitoring.

Discussed herein are methods and a systems for testing the quality and/or connectivity of a network connection, detecting and/or diagnosing a network system outage, and/or relaying information about that outage to support staff for the network (e.g., Internet Service Provider (ISP) and/or the customer). More specifically, the systems and methods discussed herein may enable a user to determine whether a cause of an outage is located "upstream" from their connection to a network, and therefore are unable to fix the outage themselves, or the outage is located "downstream" (e.g., at their location), and therefore are able to fix the outage themselves (e.g., reboot a local router, power cycle a device, etc.). In some cases, the systems and methods discussed herein may enable a user to determine a connectivity status of another user at a remote location (e.g., student and/or worker operating at home).

In some examples, a diagnostic server may be connected (e.g., a wired connection such as via an ethernet cable) to a router and/or an ISP equipment at a user's location. The diagnostic server may include lights that guide the user to determine by visual representations if their Internet connection is operational and/or whether the connection meets minimum functionality for various applications that run over an Internet connection, such as voice over (VO) IP and/or video-conferencing. In some cases, the diagnostic server may include a testing component capable of pinging one or more nodes (e.g., routers, testing servers, diagnostic logging servers, etc.) in order to determine a source of a connectivity issue (e.g., outage). In some examples, the diagnostic server may test for latency, jitter, and/or network availability at defined bandwidth speeds. In some cases, the diagnostic server may store testing data and send a network status indication to a user equipment (UE) and/or a computing device associated with an ISP. In some examples, if the connection is operational, all lights (or other status indicators) on the diagnostic server may be displayed as "green". If not operational, one or more lights will be "red", and the user may look at an accompanying troubleshooting sheet as to the potential reason of the outage and how to deal with the outage. For instance, if there is a major service provider outage, the troubleshooting sheet based on the color of the lights, may inform the user that there is no reason to call the Internet service provider as the problem is not at the customers location and the Internet service provider is aware of the outage. Other interactions of the troubleshooting guide may inform the user to reboot their router and/or Internet service providers equipment to potentially fix their Internet outage.

In some examples, the diagnostic server may provide Internet or network testing for latency, jitter, and/or Internet throughput. In some cases, a light on the diagnostic server may be dedicated to informing the user of a quality of a connection from the testing of various types of service, such as a minimum quality for VOW and/or video-conferencing. In some cases, if this light is "green" the connection may be acceptable for VOIP and/or video-conferencing. Additionally, and/or alternatively, if the light is "red" the connection may not be suitable for VOIP and/or video-conferencing. Additionally, and/or alternatively, if the light is "yellow" the connection may be marginal for VOIP and/or video-conferencing. In some examples, the testing of the connection may be performed on Internet service providers ingress/egress router by having the diagnostic server connected directly to this router and testing can be done via one or more servers outside of the Internet service providers' network.

In some cases, the diagnostic server may communicate with an application downloadable to a user's computing device (e.g., user equipment (UE)) in order to facilitate monitoring of the network and/or communication with the user. For example, the user may download the application onto the UE and the application may establish a connection (e.g., internet connection via Wi-Fi, cellular connection, private network connection, public network connection, etc.) with the diagnostic server.

In some examples, the user may enter identification data (e.g., a telephone number associated with the user and/or UE) as well as other information (e.g., a data record) into the application via an application interface and the diagnostic server may receive the identification data from the application. In some cases, the identification data may include a customer identifier, an internet protocol (IP) address, a subnet mask, a gateway, a domain name system (DNS), a Wi-Fi received signal strength indicator (RSSI) level, a cellular carrier's IP address, a cellular carrier's subnet mask, cellular carrier's gateway, a cellular carrier's RSSI, or a cellular carrier's name. In some cases, the diagnostic server may receive identification data from a source other than the application. For instance, an employee of an ISP may manually add the user's internet protocol (IP) information and registration ID into a diagnostic server.

In some cases, the application may send an indication to the diagnostic server that the application is going to establish a testing session and begin sending testing data that identifies metrics associated with a network to the diagnostic server. In some cases, the testing data may include connectivity testing for latency, jitter, and/or network availability at defined bandwidth speeds. In some cases, the diagnostic server may store the testing data and send a network status indication to the UE and/or a computing device associated with an ISP. For example, the diagnostic server may determine that an RSSI value associated with the network has dropped below a threshold value and the diagnostic server may send a notification to the UE and/or the computing device associated with the ISP that the RSSI has dropped below the threshold value. In some cases, the notification may include a message to the user of the UE to get closer to a Wi-Fi router and/or a cell tower in order to improve the network conditions.

In some examples, the application stored on the UE may establish a testing session and ping different nodes of a network to obtain operational data associated with each node. For example, the UE may download the application and establish a communication session with the diagnostic server. The application may send identification data (e.g., customer ID, phone number etc.) to the diagnostic server and the diagnostic server may send a number of IP addresses to the UE, via the application and/or carrier network, such that the application may ping the devices (e.g., routers, modems, etc.) associated with each IP addresses.

In some cases, the application and/or diagnostic server may ping a first router associated with a first IP address received from the diagnostic server. For example, the first router may be associated with an ISP that is located at a site that is "upstream" from a user's location. The application and/or diagnostic server may receive operational data from the first router (e.g., such as determining if the first router elicits a response to the ping) which, in turn, will inform the application and/or diagnostic server whether or not there is an outage located at the site caused by the first router. In some cases, if the first router does not elicit a response, the application and/or diagnostic server may inform the user (e.g., via a message, notification, and/or light indicator) that there is an outage caused by the first router and to not attempt to fix the outage at their location. In some examples, if the first router does elicit a response, the application and/or diagnostic server may inform the user (e.g., via a message, notification, and/or light indicator) that the first router is operating normally. In some cases, the application may illustrate a "green light" notification to indicate that the first router is operating normally.

In some cases, the application and/or diagnostic server may ping other routers or other devices after determining that the router upstream (e.g., the ISP router) is not the cause of an outage and/or drop in operational performance being experienced at the user's location. For example, the application and/or diagnostic server may ping a second router associated with a second IP address determined by the diagnostic server. For example, the second router may be located at a point-of-presence (POP) site that is at a user's location and is "downstream" from the first router (e.g., that is associated with the ISP). The application and/or diagnostic server may receive operational data from the second router (e.g., such as determining if the second router elicits a response to the ping) which, in turn, will inform the application and/or diagnostic server whether or not there is an outage located at the POP site caused by the second router. In some cases, if the second router does not elicit a response, the application and/or diagnostic server may inform the user (e.g., via a message, notification, and/or light indicator) that there is an outage caused by the second router located at the POP site and may provide instructions regarding how to fix the second router (e.g., reboot, re-arrange wires, etc.). In some examples, if the second router does elicit a response, the application and/or diagnostic server may inform the user (e.g., via a message, notification, and/or light indicator) that the second router is operating normally. In some cases, the application and/or diagnostic server may illustrate a "green light" notification to indicate that the second router is operating normally.

In some cases, the application and/or diagnostic server may ping other routers or other devices that are outside of the POP site after determining that the routers at the POP site are not the cause of an outage and/or drop in operational performance. For example, the application and/or diagnostic server may ping a third router associated with a third IP address determined by the diagnostic server. For example, the third router may be associated with a Wi-Fi LAN IP being used at the user's location (e.g., home and/or business). The application and/or diagnostic server may receive operational data from the third router (e.g., such as determining if the third router elicits a response to the ping) which, in turn, will inform the application and/or diagnostic server whether or not there is an outage located at the user's location. In some cases, if the third router does not elicit a response, the application and/or diagnostic server may inform the user (e.g., via a message, notification, and/or light indicator) that there is an outage caused by the third router (e.g., the Wi-Fi LAN IP) located at the user's location and may provide instructions regarding how to fix the third router (e.g., reboot, re-arrange wires, etc.). In some examples, if the third router does elicit a response, the application and/or diagnostic server may inform the user (e.g., via a message, notification, and/or light indicator) that the third router and/or the Wi-Fi LAN IP is operating normally. In some cases, the application and/or diagnostic server may illustrate a "green light" notification to indicate that the third router is operating normally.

In some examples, the application and/or diagnostic server may continue to ping other IP addresses associated with the third router if the Wi-Fi LAN IP elicits an operational response to a ping. For example, the application and/or diagnostic server may ping a Wi-Fi WAN IP associated with the third router. For example, the third router may be associated with a Wi-Fi LAN IP and Wi-Fi WAN IP being used at the user's location (e.g., home and/or business). The application and/or diagnostic server may receive operational data from the Wi-Fi WAN IP (e.g., such as determining if the Wi-Fi WAN IP elicits a response to the ping) which, in turn, will inform the application and/or diagnostic server whether or not there is an outage located at the user's location associated with the Wi-Fi WAN IP. In some cases, if the Wi-Fi WAN IP does not elicit a response, the application and/or diagnostic server may inform the user (e.g., via a message, notification, and/or light indicator) that there is an outage caused by the third router (e.g., the Wi-Fi WAN IP) located at the user's location and may provide instructions regarding how to fix the Wi-Fi WAN IP (e.g., reboot, re-arrange wires, etc.). In some examples, if the third router and/or the Wi-Fi WAN IP continues to malfunction, the application and/or diagnostic server may inform the user that the issue is caused by a node located upstream from their location. In some examples, if the third router and/or the Wi-Fi WAN IP does elicit a response, the application and/or diagnostic server may inform the user (e.g., via a message, notification, and/or light indicator) that the third router and/or the Wi-Fi WAN IP is operating normally. In some cases, the application and/or diagnostic server may illustrate a "green light" notification to indicate that the third router is operating normally.

In some cases, application and/or the diagnostic server may be in communication with multiple POP sites that may be the cause of an operational issue and/or a network outage. In some cases, the user's Wi-Fi router (e.g., the third router) may be in communication with the one or more POP sites via an ISP equipment (e.g., ISP switch, ISP router, ISP modem, etc.) located at the user's location. For example, after pinging the third router (e.g., Wi-Fi WAN IP and/or Wi-Fi LAN IP) and determining that an outage is not being caused by the third router, the application and/or diagnostic server may ping the ISP equipment via an IP addresses associated with the ISP equipment and determined from the diagnostic server. In some examples, if the ping is successful (e.g., the ISP equipment elicits a response), the application and/or diagnostic server may notify the user that the outage issue is not being caused at their location (e.g., not being caused by the third router and/or the ISP equipment located at their location). In some examples the user may be advised to refrain from disconnecting or rebooting any devices at his/her location. In some cases, if the ping to the ISP equipment is unsuccessful, the application may subsequently ping the third router's (e.g., a Wi-Fi router) WAN IP address. If the ping to the WAN IP address is successful the user may be informed (e.g., via a notification from the application and/or lights on the diagnostic server) that the problem may be local to the user's location. In some cases, the application and/or diagnostic server may advise the user on techniques to fix the outage and/or issue (e.g., check that there is power to the ISP's equipment, check to see if a cable is connected between the Wi-Fi router and the ISP's equipment, reboot the ISP equipment, etc.).

In some examples, the application and/or the UE may send the operational data associated with the routers and/or different Wi-Fi providers to the diagnostic server and the diagnostic server may send the message and/or notification to the UE via a carrier network that the UE is operating on (e.g., via a SMS). In some cases, the ISP may configure the application to send to the diagnostic server, during or not during an outage, over the UE's cellular connection, the UE's configuration information, such as IP address, subnet mask, gateway, SSID, and router's vendor information.

Additionally, for any iteration discussed herein, the ISP may download to the application images, such as photos of routers, power supplies, and/or other. For instance, if the router at the user's location is provided by the ISP, an image of the router can be shown in the application during troubleshooting procedures to help the user identify the router and how cabling should be connected to the router. Another example is if the ISP uses a power over Ethernet (POE) power supply, as used in fixed wireless broadband connectivity, the ISP can display an image to guide the user to check if the cabling is connected correctly on the POE power supply.

More details are provided below with regard to FIGS. 1-6.

FIG. 1 is a block diagram showing an illustrative environment 100 for monitoring network connectivity associated with internet service providers. The environment 100 may include a network 102 that is operated by a wireless service provider and one or more other networks coupled to network 102, such as the Internet 104. The environment 100 is illustrated in simplified form and may include many more components. In some cases, a diagnostic server 106 located at a point of presence (POP) site 108 may communicate with an application 110 downloadable to a user's computing device (e.g., user equipment (UE)) 112 in order to facilitate monitoring of the network 102, the internet 104, and/or to communicate with the user. For example, the user may download the application 110 onto the UE 112 and the application 110 may establish a connection (e.g., internet connection via Wi-Fi, cellular connection, private network connection, public network connection, etc.) with the diagnostic server 106.

In some examples, the diagnostic server 106 may be connected (e.g., via an ethernet cable) to a router 114 and/or an ISP equipment at a user's location, such as the POP site 108. The diagnostic server 106 may include lights that guide the user to determine by visual representations if their connection to the network 102 and/or Internet 104 is operational and/or whether the connection meets minimum functionality for various applications that run over an network 102 and/or Internet 104 connection, such as voice over (VO) IP and/or video-conferencing. In some cases, the diagnostic server 106 may include a testing component capable of pinging one or more nodes (e.g., sending a transmission to one or more routers, testing servers, diagnostic logging servers, etc. to determine if they are operational) in order to determine a source of a connectivity issue (e.g., outage). In some examples, the diagnostic server 106 may test for latency, jitter, and/or network availability at defined bandwidth speeds. In some cases, the diagnostic server 106 may store testing data and send a network status indication to the UE 112 and/or a computing device associated with an ISP. In some examples, if the connection is operational, all lights on the diagnostic server 106 may be displayed as "green". If not operational, one or more lights will be "red", and the user may look at an accompanying troubleshooting sheet as to the potential reason of the outage and how to deal with the outage. For instance, if there is a major service provider outage, the troubleshooting sheet based on the color of the lights, may inform the user that there is no reason to call the Internet service provider as the problem is not at the POP site 108 and the Internet service provider is aware of the outage. Other interactions of the troubleshooting guide may inform the user to reboot their router 114 and/or Internet service providers equipment to potentially fix their Internet outage.

In some examples, the diagnostic server 106 may provide Internet testing for latency, jitter, and/or Internet throughput. In some cases, a light on the diagnostic sever 106 may be dedicated to informing the user of a quality of a connection from the testing of various types of service, such as a minimum quality for VOIP and/or video-conferencing. In some cases, if this light is "green" the connection may be acceptable for VOIP and/or video-conferencing. Additionally, and/or alternatively, if the light is "red" the connection may not be suitable for VOIP and/or video-conferencing. Additionally, and/or alternatively, if the light is "yellow" the connection may be marginal for VOIP and/or video-conferencing. In some examples, the testing of the connection may be performed on Internet service providers ingress/egress router by having the diagnostic server 106 connected directly to this router and testing can be done via one or more servers outside of the Internet service providers' network.

In some examples, diagnostic server 106 may monitor and/or test the throughput and/or bandwidth being provided via a WAN, LAN, Wi-Fi, and the like. For example, the diagnostic server 106 may be physically coupled to the router 114 (e.g., via an ethernet cable) and be configured to monitor and/or test the WAN, LAN, Wi-Fi, and the like.

In some cases, the diagnostic server 106 may communicate with the application 110 downloadable to a user's computing device (e.g., user equipment (UE) 112) in order to facilitate monitoring of the network 102 and/or the Internet 104 and/or communication with the user. For example, the user may download the application 110 onto the UE 112 and the application 110 may establish a connection via the network 102 and/or the Internet 104 (e.g., internet connection via Wi-Fi, cellular connection, private network connection, public network connection, etc.) with the diagnostic server 106.

In some examples, the user may enter identification data (e.g., a telephone number associated with the user and/or UE 112) as well as other information (e.g., a data record) into the application 110 via an application 110 interface and the diagnostic server 106 may receive the identification data from the application 110. In some cases, the identification data may include a customer identifier, an internet protocol (IP) address, a subnet mask, a gateway, a domain name system (DNS), a Wi-Fi received signal strength indicator (RSSI) level, a cellular carrier's IP address, a cellular carrier's subnet mask, cellular carrier's gateway, a cellular carrier's RSSI, or a cellular carrier's name. In some cases, the diagnostic server 106 may receive identification data from a source other than the application 110. For instance, an employee of an ISP may manually add the user's internet protocol (IP) information and registration ID into the diagnostic server 106.

In some cases, the application 110 may send an indication to the diagnostic server 106 that the application 110 is going to establish a testing session and begin sending testing data that identifies metrics associated with the network 102 and/or the Internet 104 to the diagnostic server 106. In some cases, the testing data may include connectivity testing for latency, jitter, and/or network availability at defined bandwidth speeds. In some cases, the diagnostic server 106 may store the testing data and send a network status indication to the UE 112 and/or a computing device associated with an ISP. For example, the diagnostic server 106 may determine that an RSSI value associated with the network 102 and/or the Internet 104 has dropped below a threshold value and the diagnostic server 106 may send a notification to the UE 112 and/or the computing device associated with the ISP that the RSSI has dropped below the threshold value. In some cases, the notification may include a message to the user of the UE 112 to get closer to a Wi-Fi router and/or a cell tower in order to improve the network conditions.

In some examples, the application 110 stored on the UE 112 may establish a testing session and ping different nodes of a network to obtain operational data associated with each node. For example, the UE 112 may download the application 110 and establish a communication session with the diagnostic server 106. The application 110 may send identification data (e.g., customer ID, phone number etc.) to the diagnostic server 106 and the diagnostic server 106 may send a number of IP addresses to the UE 112, via the application 110 and/or carrier network, such that the application 110 may ping the devices (e.g., routers, modems, etc.) associated with each IP addresses.

In some cases, the application 110 and/or diagnostic server 106 may ping a first router associated with a first IP address received from the diagnostic server 106. For example, the first router may be associated with an ISP 116 that is located at a site that is "upstream" from a user's location, such as an ISP router 118. The application 110 and/or diagnostic server 106 may receive operational data from the ISP router 118 (e.g., such as determining if the ISP router 118 elicits a response to the ping) which, in turn, will inform the application 110 and/or diagnostic server 106 whether or not there is an outage located at the ISP 116 caused by the ISP router 118. In some cases, if the ISP router 118 does not elicit a response, the application 110 and/or diagnostic server 106 may inform the user (e.g., via a message, notification, and/or light indicator) that there is an outage caused by the ISP router 118 located at the ISP and to not attempt to fix the outage at their location. In some examples, if the ISP router 118 does elicit a response, the application 110 and/or diagnostic server 106 may inform the user (e.g., via a message, notification, and/or light indicator) that the ISP router 118 is operating normally. In some cases, the application 110 may illustrate a "green light" notification to indicate that the ISP router 118 is operating normally.

In some cases, the application 110 and/or diagnostic server 106 may ping other routers after determining that the router upstream (e.g., the ISP router 118) is not the cause of an outage and/or drop in operational performance being experienced at the user's location. For example, the application 110 and/or diagnostic server 106 may ping a second router associated with a second IP address determined by the diagnostic server 106. For example, the second router may be the router 114 located at the POP site 108 that is at a user's location and is "downstream" from the ISP router 118 (e.g., that is associated with the ISP). The application 110 and/or diagnostic server 106 may receive operational data from the router 114 (e.g., such as determining if the router 114 elicits a response to the ping) which, in turn, will inform the application 110 and/or diagnostic server 106 whether or not there is an outage located at the POP site caused by the router 114. In some cases, if the router 114 does not elicit a response, the application 110 and/or diagnostic server 106 may inform the user (e.g., via a message, notification, and/or light indicator) that there is an outage caused by the router 114 located at the POP site and may provide instructions regarding how to fix the router 114 (e.g., reboot, re-arrange wires, etc.). In some examples, if the router 114 does elicit a response, the application 110 and/or diagnostic server 106 may inform the user (e.g., via a message, notification, and/or light indicator) that the router 114 is operating normally. In some cases, the application 110 and/or diagnostic server 106 may illustrate a "green light" notification to indicate that the second router is operating normally.

In some cases, the application and/or diagnostic server 106 may ping other routers that are outside of the POP site 108 after determining that the router 114 at the POP site 108 and the ISP router 118 at the ISP 116 are not the cause of an outage and/or drop in operational performance. For example, the application 110 and/or diagnostic server 106 may ping a third router associated with a third IP address determined by the diagnostic server 106. For example, the third router may be a Wi-Fi router 120 associated with a Wi-Fi LAN IP being used at the user's location (e.g., home and/or business). The application 110 and/or diagnostic server 106 may receive operational data from the Wi-Fi router 120 (e.g., such as determining if the Wi-Fi router 120 elicits a response to the ping) which, in turn, will inform the application 110 and/or diagnostic server 106 whether or not there is an outage located at the user's location. In some cases, if the Wi-Fi router 120 does not elicit a response, the application 110 and/or diagnostic server 106 may inform the user (e.g., via a message, notification, and/or light indicator) that there is an outage caused by the Wi-Fi router 120 (e.g., the Wi-Fi LAN IP) located at the user's location and may provide instructions regarding how to fix the Wi-Fi router 120 (e.g., reboot, re-arrange wires, etc.). In some examples, if the Wi-Fi router 120 does elicit a response, the application 110 and/or diagnostic server 106 may inform the user (e.g., via a message, notification, and/or light indicator) that the Wi-Fi router 120 and/or the Wi-Fi LAN IP is operating normally. In some cases, the application 110 and/or diagnostic server 106 may illustrate a "green light" notification to indicate that the Wi-Fi router 120 is operating normally.

In some examples, the application 110 and/or diagnostic server 106 may continue to ping other IP addresses associated with the Wi-Fi router 120 if the Wi-Fi LAN IP elicits an operational response to a ping. For example, the application 110 and/or diagnostic server 106 may ping a Wi-Fi WAN IP associated with the Wi-Fi router 120. For example, the Wi-Fi router 120 may be associated with a Wi-Fi LAN IP and Wi-Fi WAN IP being used at the user's location (e.g., home and/or business). The application 110 and/or diagnostic server 106 may receive operational data from the Wi-Fi WAN IP (e.g., such as determining if the Wi-Fi WAN IP elicits a response to the ping) which, in turn, will inform the application 110 and/or diagnostic server 106 whether or not there is an outage located at the user's location associated with the Wi-Fi WAN IP. In some cases, if the Wi-Fi WAN IP does not elicit a response, the application 110 and/or diagnostic server 106 may inform the user (e.g., via a message, notification, and/or light indicator) that there is an outage caused by the Wi-Fi router 120 (e.g., the Wi-Fi WAN IP) located at the user's location and may provide instructions regarding how to fix the Wi-Fi WAN IP (e.g., reboot, re-arrange wires, etc.). In some examples, if the Wi-Fi router 120 and/or the Wi-Fi WAN IP continues to malfunction, the application 110 and/or diagnostic server 106 may inform the user that the issue is caused by a node located upstream (e.g., the ISP router 118) from their location. In some examples, if the Wi-Fi router 120 and/or the Wi-Fi WAN IP does elicit a response, the application 110 and/or diagnostic server 106 may inform the user (e.g., via a message, notification, and/or light indicator) that the Wi-Fi router 120 and/or the Wi-Fi WAN IP is operating normally. In some cases, the application 110 and/or diagnostic server 106 may illustrate a "green light" notification to indicate that the Wi-Fi router 120 is operating normally.

In some cases, the UE 112 may be an electronic device such as a smart phone, a personal digital assistant, a netbook, a laptop computer, and/or another electronic device that is capable of sending and/or receiving voice or data via the network 102 and/or a Wi-Fi network. For example, the UE 112 can be integrated into a vehicle, a drone, a plane, a bicycle, a mobile device, and the like. In some instances, the UE 112 can be configured to send and receive data using any wired or wireless protocols.

In some cases, the network 102 may be a CORE network responsible for routing voice communication to other networks, as well as routing data communication to external packet switched networks, such as the Internet 104. For example, the one or more service nodes may be a Gateway GPRS Support Node (GGSN) or another equivalent node. According to some configurations, one or more CORE gateways (GWs) also include a Policy and Charging Rules Function (PCRF) node (not shown) that is utilized to enforce policy rules of the network. The PCRF node can be configured to automatically make policy decisions for each subscriber (e.g., each user equipment (UE) active on the network. For example, the PCRF may be utilized to allocate bandwidth of the network as well as provide different levels of service to different computing devices on the network. In some configurations, the PCRF node can be used to assist in determining the location of where to perform application processing for one or more applications, such as application 110. Additionally, some data can be prioritized within the network.

Figure 2:
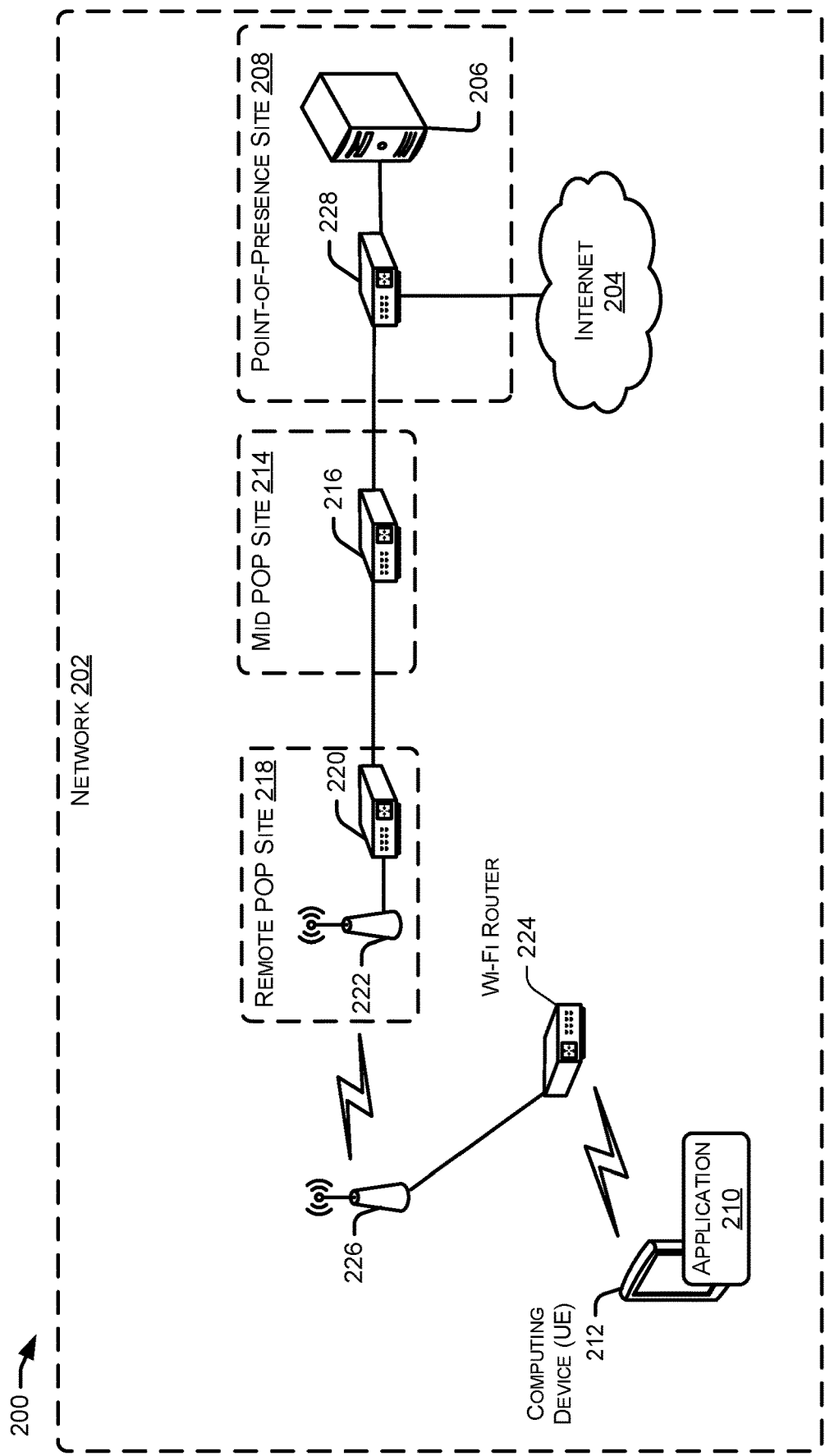
FIG. 2 is a block diagram showing an illustrative environment for network connectivity monitoring.

FIG. 2 is a block diagram showing an illustrative environment 200 for monitoring network connectivity associated with internet service providers including multiple nodes. The environment 200 may include a network 202, which may be the same or similar to the network 102, that is operated by a wireless service provider or other telecommunications type company and one or more other networks coupled to network 202, such as the Internet 204, which may be the same or similar to the Internet 104. The environment 200 is illustrated in simplified form and may include many more components. In some cases, a diagnostic server 206, which may be the same or similar to the diagnostic server 106, located at a point of presence (POP) site 208, which may be the same or similar to the POP site 108, may communicate with an application 210, which may be the same or similar to the application 110, downloadable to a user's computing device (e.g., user equipment (UE)) 212, which maybe the same or similar to the UE 112, in order to facilitate monitoring of the network 202, the Internet 204, and/or to communicate with the user. For example, the user may download the application 210 onto the UE 212 and the application 210 may establish a connection (e.g., internet connection via Wi-Fi, cellular connection, private network connection, public network connection, etc.) with the diagnostic server 206.

In some cases, the application 210 and/or the diagnostic server 206 may be in communication with multiple POP sites, such as a mid-POP site 214 associated with a mid-router 216 and a remote POP site 218 associated with a remote router 220 and an ISP equipment 222. In some cases, the devices at the mid-POP site 214 and the remote POP site 218 may be the cause of an operational issue and/or a network outage. In some cases, a Wi-Fi router 224, which may be the same or similar to the Wi-Fi router 120, may be in communication with the one or more POP sites via an ISP equipment 226 (e.g., ISP switcher, ISP router, ISP modem, etc.) located at the user's location. For example, the application 210 and/or the diagnostic server 206 may ping an ISP router (such as ISP router 118), the a router 228 located at the POP site 208, and the Wi-Fi router 224 in order to determine a cause of an outage and/or a drop in operational service. In some cases, after pinging the Wi-Fi router 224 (e.g., Wi-Fi WAN IP and/or Wi-Fi LAN IP) and determining that an outage is not being caused by the Wi-Fi router 224, the application 210 and/or diagnostic server 206 may ping the ISP equipment 226 via an IP addresses associated with the ISP equipment 226 and determined from the diagnostic server 206. In some examples, if the ping is successful (e.g., the ISP equipment 226 elicits a response), the application 210 and/or diagnostic server 206 may notify the user that the outage issue is not being caused at their location (e.g., not being caused by the Wi-Fi router 224 and/or the ISP equipment 226 located at their location). In some examples the user may be advised to refrain from disconnecting or rebooting any devices at his/her location. In some cases, if the ping to the ISP equipment 226 is unsuccessful, the application 210 and/or the diagnostic server 206 may subsequently ping the Wi-Fi router 224 WAN IP address. If the ping to the WAN IP address is successful the user may be informed (e.g., via a notification from the application 210 and/or lights on the diagnostic server 206) that the problem may be local to the user's location. In some cases, the application 210 and/or diagnostic server 206 may advise the user on techniques to fix the outage and/or issue (e.g., check that there is power to the ISP's equipment 226, check to see if a cable is connected between the Wi-Fi router 224 and the ISP's equipment 226, reboot the ISP equipment 226, etc.).

In some examples, the application 210 and/or the UE 212 may send the operational data associated with the routers (e.g., the router 228, the mid router 216, the remote router 220, and/or the Wi-Fi router 224) and/or different Wi-Fi providers to the diagnostic server 206 and the diagnostic server 206 may send the message and/or notification to the UE 212 via a carrier network (e.g., the network 202) that the UE 212 is operating on (e.g., via a SMS). In some cases, an ISP may configure the application 210 to send to the diagnostic server 206, during or not during an outage, over the UE's 212 cellular connection, the UE's 212 configuration information, such as IP address, subnet mask, gateway, SSID, and router's vendor information. Additionally, for any iteration discussed herein, the ISP may download to the application 210 images, such as photos of routers, power supplies, and/or other. For instance, if the router 228, the ISP equipment 226, and/or the Wi-Fi router 224 at the user's location is provided by the ISP, an image of the devices can be shown in the application 210 during troubleshooting procedures to help the user identify the device and how cabling should be connected to the devices. Another example is if the ISP uses a power over Ethernet (POE) power supply, as used in fixed wireless broadband connectivity, the ISP can display an image to guide the user to check if the cabling is connected correctly on the POE power supply. In some cases, an ISP and/or a user may schedule monitoring of the network 202 and/or the Internet 204, in some cases, via the application 210. For example, the user and or the ISP may configure the application 210 and/or the diagnostic server 206 to periodically ping at least one of the router 228, the mid router 216, the remote router 220, the ISP equipment 226, and/or the Wi-Fi router 224 based on a programmed schedule entered from an ISP and/or the user via the application 210 and/or an accessible interface provided to the user and/or the ISP.

Figure 3:
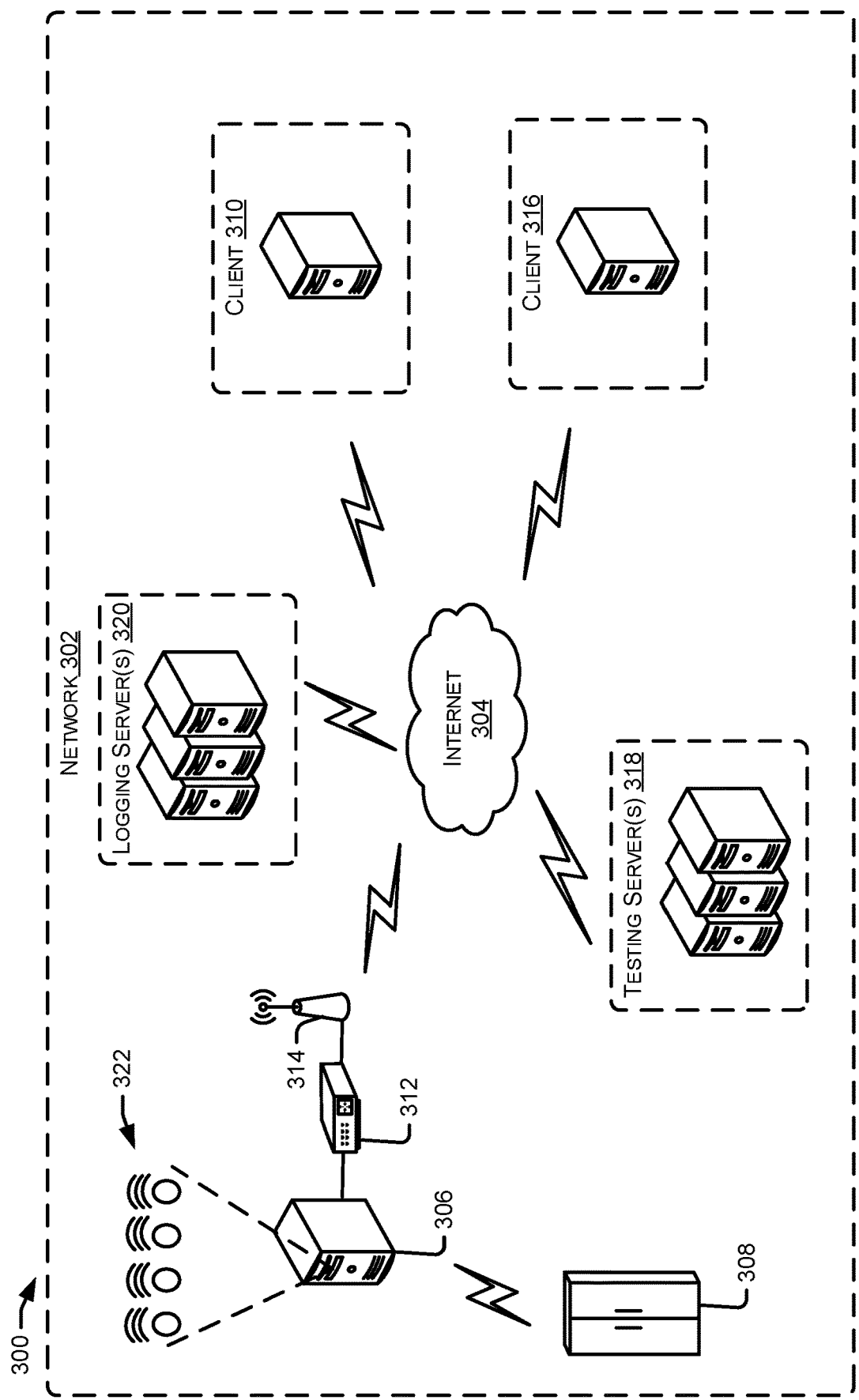
FIG. 3 is a diagram showing an illustrative environment for network connectivity monitoring.

FIG. 3 is a block diagram showing an illustrative environment 300 for monitoring network connectivity associated with internet service providers including multiple nodes. The environment 300 may include a network 302, which may be the same or similar to the network 102/202, that is operated by a wireless service provider or other telecommunications service provider and one or more other networks coupled to network 302, such as the Internet 304, which may be the same or similar to the Internet 104/204.

The environment 300 is illustrated in simplified form and may include many more components. In some cases, a diagnostic server 306, which may be the same or similar to the diagnostic server 106/206, configured to facilitate monitoring of the network 302, the internet 304, and/or to communicate with a user.

In some examples, the diagnostic sever 306 may be configured to monitor a connection status of one or more devices, such as an appliance 308. For example, the diagnostic server 306 may be in communication with the appliance 308 via a Wi-Fi connection and/or an ethernet connection and configured to monitor a connection status that the appliance 308 has with the network 302 and/or the internet 304. In some cases, the connection status may be reported to a user, such as an owner of the appliance 308 and/or a manufacturer of the appliance 308. For example, a client 310 may monitor a connection status of the appliance 308 via one or more interfaces, such as an application programming interface (API) provided to the client 310 via the diagnostic server 306. The diagnostic server 306 may monitor a connection status of the appliance 308 via the methods discussed herein (e.g., pinging routers, switchers, ISP equipment, etc.) and report the connection status to the network 302 and/or the internet 304 to the client 310.

In some cases, the diagnostic server 306 may enable an entity, such as a school worker and/or an employer, to monitor a connection status of a router at a user's remote location when the user is a student of the school worker and/or an employee of an employer. For example, the diagnostic server 306 may be in communication with a router 312 and/or an ISP equipment 314 via a Wi-Fi connection and/or an ethernet connection and configured to monitor a connection status that the router 312 and/or an ISP equipment 314 has with the network 302 and/or the Internet 304. In some cases, the connection status may be reported to a user, such as a school employee and/or an employer. For example, a client 316 may monitor a connection status of the router 312 and/or an ISP equipment 314 via one or more interfaces, such as an application programming interface (API) provided to the client 316 via the diagnostic server 306. The diagnostic server 306 may monitor a connection status of the router 312 and/or an ISP equipment 314 via the methods discussed herein (e.g., pinging routers, switchers, ISP equipment, etc.) and report the connection status to the network 302 and/or the internet 304 to the client 316.

In some cases, the diagnostic server 306 may be configured to determine a bandwidth connection (e.g., perform a speed test) associated with the router 312 and/or an ISP equipment 314. For example, the diagnostic server 306 may be in communication with one or more testing server(s) 318 configured to provide a bandwidth measurement of one or more Wi-Fi networks accessible by the router 312. In some cases, the diagnostic server 306 may utilize one or more testing protocols (e.g., RFC2544 and/or Y1564) while testing the connection of the router 312 and/or the ISP equipment 314. In some cases, the diagnostic server may generate testing data associated with the router 312 and/or the ISP equipment 314 and provide the testing data to a user, for example, via an application stored on a UE and/or one or more APIs. In some cases, the testing server(s) 318 may be configured to provide an aggregate measurement a bandwidth measurement of one or more Wi-Fi networks (and/or other types of networks) accessible by the router 312.

In some cases, the data collected by the diagnostic server 306 (e.g., testing data, connectivity data, etc.) may be sent to and stored by one or more logging server(s) 320. For example, the logging server(s) 320 may receive data (e.g., testing data, connectivity data, etc.) from the diagnostic server 306 and store the data thereby generating a historical record of network connectivity and/or network status for identified routers (e.g., the router 312) and/or ISP equipment (e.g. the ISP equipment 314). In some cases, the logging servers 320 may store data based on user information, such as name, address, IP address, phone number, etc. In some examples, the data stored in the logging servers 320 may be accessible by one or more users, such as users associated with the monitored devices, ISPs associated with the monitored devices, and/or third-party members who may have an interest in the stored data (e.g., teachers, employers, equipment manufacturers, etc.) such as the clients 310 and 316.

In some cases, the diagnostic server 306 may include one or more lights 322 to provide an indication of an operational status of the router 312, the ISP equipment 314, the internet 304, and or the network 302. In some cases, there may be four lights, in other cases, there may be more or less than four lights. For example, in some cases, if a light is "green" the connection may be acceptable for certain services, such as VOIP and/or video-conferencing. Additionally, and/or alternatively, if the light is "red" the connection may not be suitable for certain services. Additionally, and/or alternatively, if the light is "yellow" the connection may be marginal for certain services. In some examples, a combination of colors of the lights 322 may provide particular indications. For example, if all of the lights 322 are "green" the diagnostic server 306 may indicate to a user that the internet 304 and/or the network 302 is operational. In some cases, if a first light is red, the diagnostic server 306 may indicate to a user that there is a major outage of the internet 304 and/or the network 302 and to not attempt to fix the outage themselves. In some cases, if a first light and a second light are red, the diagnostic server 306 may indicate to a user that there may be a connectivity issue between the router 312 and the ISP equipment 314 and to reboot the ISP equipment 314 and/or make sure that the router 312 and the ISP equipment 314 are properly connected. In some cases, if a first light, a second light, and a third light are red, the diagnostic server 306 may indicate to a user that there may be a connectivity issue with the router 312 and to reboot the router 312. In some cases, if a first light, a second light, and a third light are blinking red, the diagnostic server 306 may indicate to a user that the router 312 has been reset to default settings and may provide instructions regarding how to reset the router 312 to user preferred settings.

Figure 4:
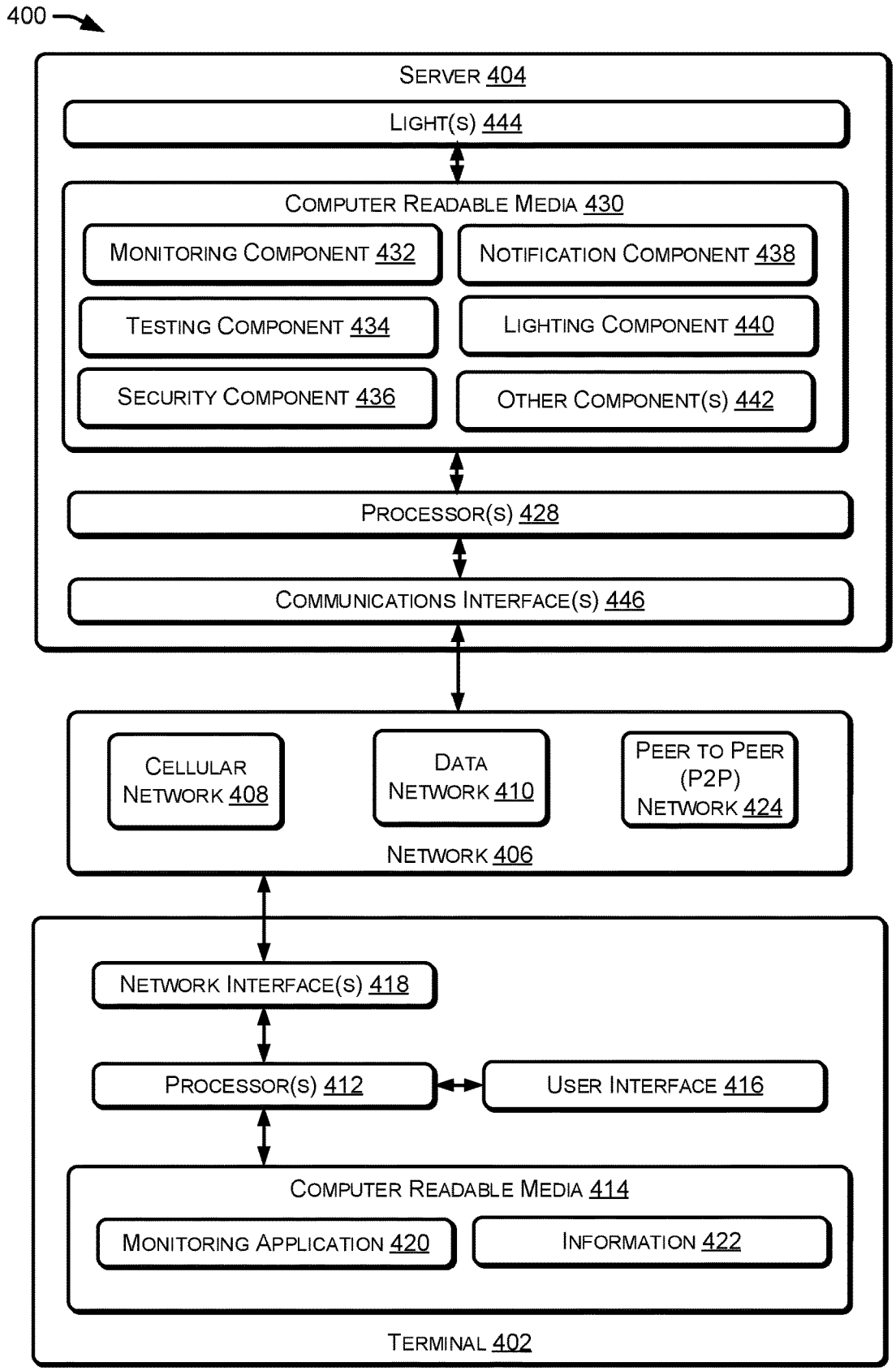
FIG. 4 is a block diagram illustrating a system that includes components for network connectivity monitoring.

FIG. 4 is a block diagram illustrating a system 400 that includes a network monitoring component 432 for monitoring a connectivity of a network and/or internet connection according to some implementations. The system 400 includes a terminal 402, which can represent UE 112 and/or UE 212, of FIGS. 1 and 2, coupled to a server 404, via a network 406. The server 404 can represent one or more of the diagnostic servers 106, 206, and/or 306. The network 406 can represent, e.g., networks 102, 202, 302, the internet 104, the internet 204, internet the 304, and/or other networks.

The network 406 can include one or more networks, such as a cellular network 408, a data network 410, and a peer to peer (PTP) network 424. The network 406 can include one or more core network(s) connected to terminal(s) via one or more access network(s). Example access networks include LTE, WIFI, GSM Enhanced Data Rates for GSM Evolution (EDGE) Radio Access Network (GERAN), UTRAN, and other cellular access networks. Message transmission, reception, fallback, and deduplication as described herein can be performed, e.g., via 3G, 4G, 5G, WIFI, or other networks.

The cellular network 408 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), 5G New Radio (NR), Device-To-Device (D2D), Vehicle-To-Everything (V2X) direct communication, Generic Access Network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 404 and terminals such as the terminal 402 can additionally or alternatively be performed using other technologies, such as wired (Plain Old Telephone Service, POTS, or PSTN lines), optical (e.g., Synchronous Optical NETwork, SONET) technologies, and the like.

The data network 410 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 404 includes or is communicatively connected with an IWF or other device bridging networks, e.g., LTE, 3G, and POTS networks. In some examples, the server 404 can bridge SS7 traffic from the PSTN into the network 406, e.g., permitting PSTN customers to place calls to cellular customers and vice versa.

In some examples, the cellular network 408, the data network 410, and the P2P network 424 can carry voice or data. For example, the data network 410 can carry voice traffic using VoIP or other technologies as well as data traffic, or the cellular network 408 can carry data packets using HSPA, LTE, or other technologies as well as voice traffic. The P2P network 424 can carry signaling/data traffic from neighboring devices/network in a mesh-like communication such as Skype, or a direct communication such as D2D, vehicle-to-everything (V2X) messages, and the like. Some cellular networks 408 carry both data and voice in a packet-switch (PS) format. For example, many LTE networks carry voice traffic in data packets according to the VoLTE standard. Various examples herein provide origination and termination of, e.g., carrier-grade voice calls on, e.g., networks 406 using circuit-switching (CS) transports or mixed VoLTE/3G transports, or on terminals 402 including OEM handsets and non-OEM handsets.

The terminal 402 can be or include a wireless phone, a wired phone, a tablet computer, a laptop computer, a wristwatch, or other type of terminal. The terminal 402 can include one or more processors 412, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 414, such as memory (e.g., random access memory (RAM), solid state drives (SSDs), or the like), disk drives (e.g., platter-based hard drives), another type of computer-readable media, or any combination thereof. The CRM or other memory of terminal 402 can hold a datastore, e.g., an SQL or NoSQL database, a graph database, a BLOB, or another collection of data. The terminal 402 can further include a user interface (UI) 416, e.g., including an electronic display device, a speaker, a vibration unit, a touchscreen, or other devices for presenting information to a user and receiving commands from the user. The terminal 402 can further include one or more network interface(s) 418 configured to selectively communicate (wired or wirelessly) via the network 406, e.g., via an access network 102, 202, and/or 302.

The CRM 414 can be used to store data and to store instructions that are executable by the processors 412 to perform various functions as described herein. The CRM 414 can store various types of instructions and data, such as an operating system, device drivers, etc. The processor-executable instructions can be executed by the processors 412 to perform the various functions described herein.

The CRM 414 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 412. Tangible computer-readable media can include volatile and nonvolatile, removable and non-removable media implemented in any method or technology for storage of information, such as computer readable instructions, data structures, program components, or other data.

The CRM 414 can include processor-executable instructions of a monitoring application 420. The monitoring application 420, e.g., a native or other dialer, can permit a user to originate and terminate communication sessions associated with the terminal 402, e.g., a wireless phone. The monitoring application 420 can additionally or alternatively include an Sms, RCS, or presence client, or a client of another telephony service offered by the server 404. The monitoring application 420 can also be any other type of application, such as application 110 and/or application 210 described herein.

The CRM 414 can store information 422 identifying the terminal 402. The information 422 can include, e.g., an IMEI, an ImsI identifying the subscriber using terminal 402, or other information discussed above. The CRM 414 can additionally or alternatively store credentials (omitted for brevity) used for access, e.g., to Ims or RCS services.

The server 404 can include one or more processors 428 and one or more CRM 430. The CRM 430 can be used to store processor-executable instructions of a network monitoring component 432, a testing component 434, a security component 436, a notification component 438, a lighting component 440, as well as one or more other components 442. In some configurations, the server 404 can be configured as a diagnostic server 106, 206, 306, and the like. The processor-executable instructions can be executed by the one or more processors 428 to perform various functions described herein, e.g., with reference to FIGS. 1-3, and 5-7.

In some examples, the monitoring component 432 may be configured to monitor a connectivity status to one or more networks, such as the network 406. For example, the monitoring component 432 may communicate with an application downloadable to a user's computing device (e.g., user equipment (UE)) in order to facilitate monitoring of the network and/or communication with the user. For example, the user may download the application onto the UE and the application may establish a connection (e.g., internet connection via Wi-Fi, cellular connection, private network connection, public network connection, etc.) with the server 404. In some examples, the user may enter identification data (e.g., a telephone number associated with the user and/or UE) as well as other information (e.g., a data record) into the application via an application interface and the monitoring component 432 may receive the identification data from the application. In some cases, the identification data may include a customer identifier, an internet protocol (IP) address, a subnet mask, a gateway, a domain name system (DNS), a Wi-Fi received signal strength indicator (RSSI) level, a cellular carrier's IP address, a cellular carrier's subnet mask, cellular carrier's gateway, a cellular carrier's RSSI, or a cellular carrier's name. In some cases, the monitoring component 432 may receive identification data from a source other than the application. For instance, an employee of an ISP may manually add the user's internet protocol (IP) information and registration ID into the monitoring component 432. The monitoring component 432 may be utilized to ping a connectivity status to various nodes (e.g., routers, switchers, ISP equipment, etc.) of a network, as discussed above and below.

In some examples, the testing component 434 may be configured to test a bandwidth associated with one or more networks, such as the network 406. For example, the server 404 may be connected (e.g., via an ethernet cable) to a router and/or an ISP equipment at a user's location. The server 404 may include lights 444 that guide the user to determine by visual representations if their Internet connection is operational and/or whether the connection meets minimum functionality for various applications that run over an Internet connection, such as voice over (VO) IP and/or video-conferencing. In some cases, the testing component 434 may ping one or more nodes (e.g., routers, testing servers, diagnostic logging servers, etc.) in order to determine a source of a connectivity issue (e.g., outage) and/or a bandwidth measurement. In some examples, the testing component 434 may test for latency, jitter, and/or network availability at defined bandwidth speeds. In some cases, the testing component 434 may store testing data and send a network status indication to a user equipment (UE) and/or a computing device associated with an ISP. In some examples, if the connection is operational, all lights 444 on the server 404 may be displayed as "green". If not operational, one or more lights will be "red", and the user may look at an accompanying troubleshooting sheet as to the potential reason of the outage and how to deal with the outage. For instance, if there is a major service provider outage, the troubleshooting sheet based on the color of the lights, may inform the user that there is no reason to call the Internet service provider as the problem is not at the customers location and the Internet service provider is aware of the outage. Other interactions of the troubleshooting guide may inform the user to reboot their router and/or Internet service providers equipment to potentially fix their Internet outage.

In some examples, the testing component 434 may provide Internet testing for latency, jitter, and/or Internet throughput. In some cases, the lights 444 on the server 404 may be dedicated to informing the user of a quality of a connection from the testing of various types of service, such as a minimum quality for VOIP and/or video-conferencing. In some cases, if this light is "green" the connection may be acceptable for VOIP and/or video-conferencing. Additionally, and/or alternatively, if the light is "red" the connection may not be suitable for VOIP and/or video-conferencing.

Additionally, and/or alternatively, if the light is "yellow" the connection may be marginal for VOIP and/or video-conferencing. In some examples, the testing of the connection may be performed on Internet service providers ingress/egress router by having the server 404 connected directly to this router and testing can be done via one or more servers outside of the Internet service providers' network.

In some examples, the security component 436 may be configured to monitor a status of the server 404. For example, security component 436 may be configured to prevent a user from removing the server 404 from a connection to another device, such as a router and/or an ISP equipment. In some cases, the security component 436 may be coupled to a backup battery (not shown), a motion detector (e.g., gyroscope, accelerometer, etc.) (not shown), and/or a Wi-Fi chip (not shown) configured to determine if the server 404 has been moved (e.g., via the motion detector) and to operate using the back-up battery if unplugged. In some cases, the security component 436 may be configured to send a message, e.g., via the Wi-Fi chip and to the terminal 402 and/or another user, that the server 404 is experiencing a tampering event. In some cases, the security component 436 may determine that the event is indeed a tampering event based at least in part on an algorithm configured to input data from the motion detector, back-up battery, and/or Wi-Fi chip and determine if the data indicates that the event is a tampering event. In some examples, the security component 436 may send a message indicating that a tampering event has occurred via a virtual private network (VPN). In some examples, the server 404 may be configured to generate a VPN accessible by the user via a user device, such as the terminal 402.

In some examples, the notification component 438 may be configured to cause a device, such as the terminal 402 to display information. For example, the notification component 438 may enable a user to replace incoming advertisements to be displayed on their device as the advertisement data is received by the server 404 prior to be displayed on a user device. For example, the server 404 may be connected to a router that receives advertisement data from an ISP. The notification component 438 may be utilized to filter out any and/or all of the advertisement data received by the router. In some cases, the notification component 438 may be utilized to provide alerts on a user device, such as Amber Alerts, weather alerts, safety alerts, etc.

In some examples, the lighting component 440 may be configured to cause one or more lights 444 of the server 404 to activate. For example, the server 404 may include one or more lights 444 to provide an indication of an operational status of a router, a ISP equipment, the internet, and or a network. For example, in some cases, if a light is "green" the connection may be acceptable for certain services, such as VOIP and/or video-conferencing. Additionally, and/or alternatively, if the light is "red" the connection may not be suitable for certain services. Additionally, and/or alternatively if the light is "yellow" the connection may be marginal for certain services. In some examples, a combination of colors of the lights 444 may provide particular indications. For example, if all of the lights 444 are "green" the lighting component 440 may indicate to a user that the internet and/or the network is operational. In some cases, if a first light is red, the lighting component 440 may indicate to a user that there is a major outage of the internet and/or the network and to not attempt to fix the outage themselves. In some cases, if a first light and a second light are red, the lighting component 440 may indicate to a user that there may be a connectivity issue between the router and the ISP equipment and to reboot the ISP equipment and/or make sure that the router and the ISP equipment are properly connected. In some cases, if a first light, a second light, and a third light are red, the lighting component 440 may indicate to a user that there may be a connectivity issue with the router and to reboot the router. In some cases, if a first light, a second light, and a third light are blinking red, the lighting component 440 may indicate to a user that the router has been reset to default settings and may provide instructions regarding how to reset the router to user preferred settings.

In some examples, server 404 can communicate with (e.g., is communicatively connectable with) terminal 402 or other devices via one or more communications interface(s) 446, e.g., network transceivers for wired or wireless networks, or memory interfaces. Example communications interface(s) 446 can include ETHERNET or FIBER CHANNEL transceivers, cable modem interface, WIFI radios, application programming interface (API) components, and/or DDR memory-bus controllers (e.g., for DMA transfers to a network card installed in a physical server 404).

In some examples, processor 412 and, if required, CRM 414, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 428 and, if required, CRM 430.

In the flow diagrams of FIGS. 5-8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 700 are described with reference to the systems 100, 200, 300, and 400 as described above, although other models, frameworks, systems and environments may implement these processes.

Figure 5:
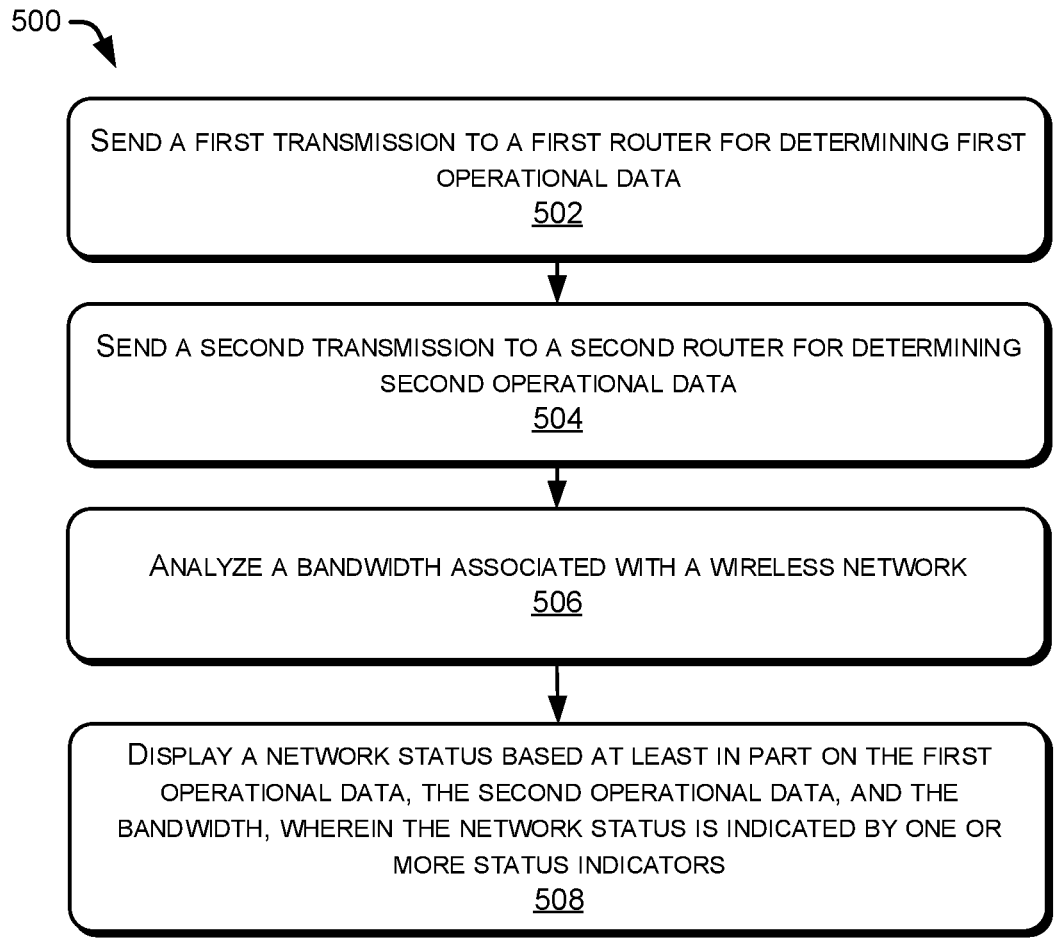
FIG. 5 is a flow diagram of an example process that includes determining a network status and providing an indication of the network status via one or more lights, according to some implementations.

FIG. 5 is a flow diagram of an example process 500 that includes determining a network status and providing an indication of the network status via one or more lights, according to some implementations. The process 500 may be performed by one or more computing devices, such as the computing devices described with regard to FIGS. 1-4.

At 502, the example process 500 may include sending a first transmission to a first router for determining first operational data. For example, the first router may be associated with an ISP that is located at a site that is "upstream" from a user's location. The application and/or diagnostic server may receive operational data from the first router (e.g., such as determining if the first router elicits a response to the ping) which, in turn, will inform the application and/or diagnostic server whether or not there is an outage located at the site caused by the first router. In some cases, if the first router does not elicit a response, the application and/or diagnostic server may inform the user (e.g., via a message, notification, and/or light indicator) that there is an outage caused by the first router and to not attempt to fix the outage at their location. In some examples, if the first router does elicit a response, the application and/or diagnostic server may inform the user (e.g., via a message, notification, and/or light indicator) that the first router is operating normally. In some cases, the application may illustrate a "green light" notification to indicate that the first router is operating normally.

At 504, the example process 500 may include sending a second transmission to a second router for determining second operational data. For example, the application and/or diagnostic server may ping a second router associated with a second IP address determined by the diagnostic server. For example, the second router may be located at a point-of-presence (POP) site that is at a user's location and is "downstream" from the first router (e.g., that is associated with the ISP). The application and/or diagnostic server may receive operational data from the second router (e.g., such as determining if the second router elicits a response to the ping) which, in turn, will inform the application and/or diagnostic server whether or not there is an outage located at the POP site caused by the second router. In some cases, if the second router does not elicit a response, the application and/or diagnostic server may inform the user (e.g., via a message, notification, and/or light indicator) that there is an outage caused by the second router located at the POP site and may provide instructions regarding how to fix the second router (e.g., reboot, re-arrange wires, etc.). In some examples, if the second router does elicit a response, the application and/or diagnostic server may inform the user (e.g., via a message, notification, and/or light indicator) that the second router is operating normally. In some cases, the application and/or diagnostic server may illustrate a "green light" notification to indicate that the second router is operating normally.

At 506, the example process 500 may include analyzing a bandwidth associated with a wireless network. For example, the diagnostic server may provide Internet testing for latency, jitter, and/or Internet throughput. In some cases, a light on the diagnostic server may be dedicated to informing the user of a quality of a connection from the testing of various types of service, such as a minimum quality for VOIP and/or video-conferencing. In some cases, the diagnostic server 306 may be in communication with one or more testing server(s) 318 configured to provide a bandwidth measurement of one or more Wi-Fi networks accessible by the router 312. In some cases, the diagnostic server 306 may utilize one or more testing protocols (e.g., RFC2544 and/or Y1564) while testing the connection of the router 312 and/or the ISP equipment 314. In some cases, the diagnostic server may generate testing data associated with the router 312 and/or the ISP equipment 314 and provide the testing data to a user, for example, via an application stored on a UE and/or one or more APIs.

At 508, the example process 500 may include displaying a network status based at least in part on the first operational data, the second operational data, and the bandwidth, wherein the network status is indicated by one or more status indicators. For example, the diagnostic server 306 may include one or more lights 322 to provide an indication of an operational status of the router 312, the ISP equipment 314, the internet 304, and or the network 302. For example, in some cases, if a light is "green" the connection may be acceptable for certain services, such as VOIP and/or video-conferencing. Additionally, and/or alternatively, if the light is "red" the connection may not be suitable for certain services. Additionally, and/or alternatively, if the light is "yellow" the connection may be marginal for certain services. In some examples, a combination of colors of the lights 322 may provide particular indications. For example, if all of the lights 322 are "green" the diagnostic server 306 may indicate to a user that the internet 304 and/or the network 302 is operational. In some cases, if a first light is red, the diagnostic server 306 may indicate to a user that there is a major outage of the internet 304 and/or the network 302 and to not attempt to fix the outage themselves. In some cases, if a first light and a second light are red, the diagnostic server 306 may indicate to a user that there may be a connectivity issue between the router 312 and the ISP equipment 314 and to reboot the ISP equipment 314 and/or make sure that the router 312 and the ISP equipment 314 are properly connected. In some cases, if a first light, a second light, and a third light are red, the diagnostic server 306 may indicate to a user that there may be a connectivity issue with the router 312 and to reboot the router 312. In some cases, if a first light, a second light, and a third light are blinking red, the diagnostic server 306 may indicate to a user that the router 312 has been reset to default settings and may provide instructions regarding how to reset the router 312 to user preferred settings.

Figure 6:
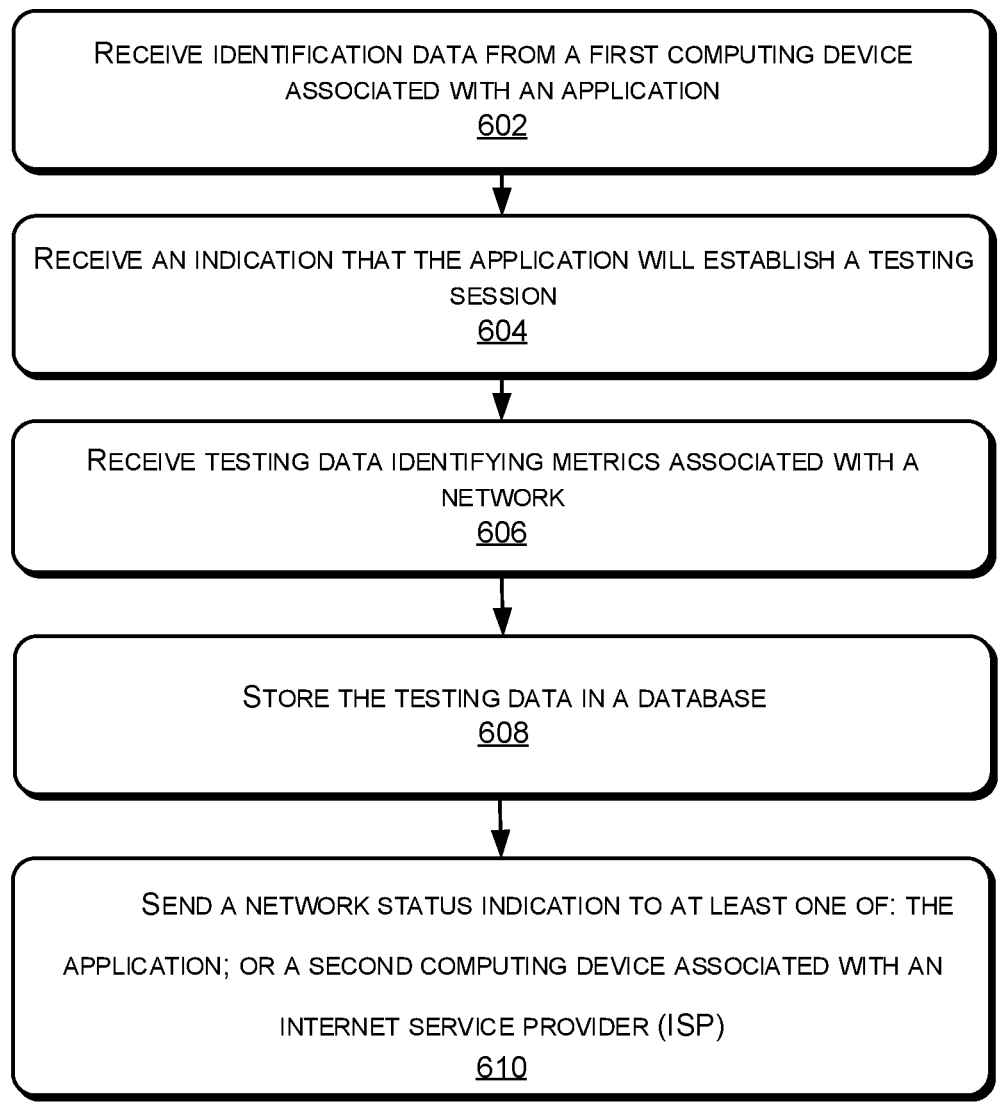
FIG. 6 is a flow diagram of an example process that includes determining a network status and providing an indication of the network status to one or more other devices, according to some implementations.

FIG. 6 is a flow diagram of an example process 600 that includes determining a network status and providing an indication of the network status to one or more other devices, according to some implementations. The process 600 may be performed by one or more computing devices, such as the computing devices described with regard to FIGS. 1-4.

At 602, the example process 600 may include receiving identification data from a first computing device associated with an application. For example, the user may enter identification data (e.g., a telephone number associated with the user and/or UE) as well as other information (e.g., a data record) into the application via an application interface and the diagnostic server may receive the identification data from the application. In some cases, the identification data may include a customer identifier, an internet protocol (IP) address, a subnet mask, a gateway, a domain name system (DNS), a Wi-Fi received signal strength indicator (RSSI) level, a cellular carrier's IP address, a cellular carrier's subnet mask, cellular carrier's gateway, a cellular carrier's RSSI, or a cellular carrier's name. In some cases, the diagnostic server may receive identification data from a source other than the application. For instance, an employee of an ISP may manually add the user's internet protocol (IP) information and registration ID into a diagnostic server. In some cases, the application may send identification data (e.g., customer ID, phone number etc.) to the diagnostic server and the diagnostic server may send a number of IP addresses to the UE, via the application and/or carrier network, such that the application may ping the devices (e.g., routers, modems, etc.) associated with each IP addresses.

At 604, the example process 600 may include receiving an indication that the application will establish a testing session. For example, the application may send an indication to the diagnostic server that the application is going to establish a testing session and begin sending testing data that identifies metrics associated with a network to the diagnostic server.

At 606, the example process 600 may include receiving testing data identifying metrics associated with a network. For example, the testing data may include connectivity testing for latency, jitter, and/or network availability at defined bandwidth speeds.

At 608, the example process 600 may include storing the testing data in a database. For example, the logging server(s) 320 may receive data (e.g., testing data, connectivity data, etc.) from the diagnostic server 306 and store the data thereby generating a historical record of network connectivity and/or network status for identified routers (e.g., the router 312) and/or ISP equipment (e.g. the ISP equipment 314). In some cases, the logging servers 320 may store data based on user information, such as name, address, IP address, phone number, etc. In some examples, the data stored in the logging servers 320 may be accessible by one or more users, such as users associated with the monitored devices, ISPs associated with the monitored devices, and/or third-party members who may have an interest in the stored data (e.g., teachers, employers, equipment manufacturers, etc.) such as the clients 310 and 316.

At 610, the example process 600 may include sending a network status indication to at least one of: the application; or a second computing device associated with an internet service provider (ISP). For example, the diagnostic server may determine that an RSSI value associated with the network has dropped below a threshold value and the diagnostic server may send a notification to the UE and/or the computing device associated with the ISP that the RSSI has dropped below the threshold value. In some cases, the notification may include a message to the user of the UE to get closer to a Wi-Fi router and/or a cell tower in order to improve the network conditions.

Figure 7:
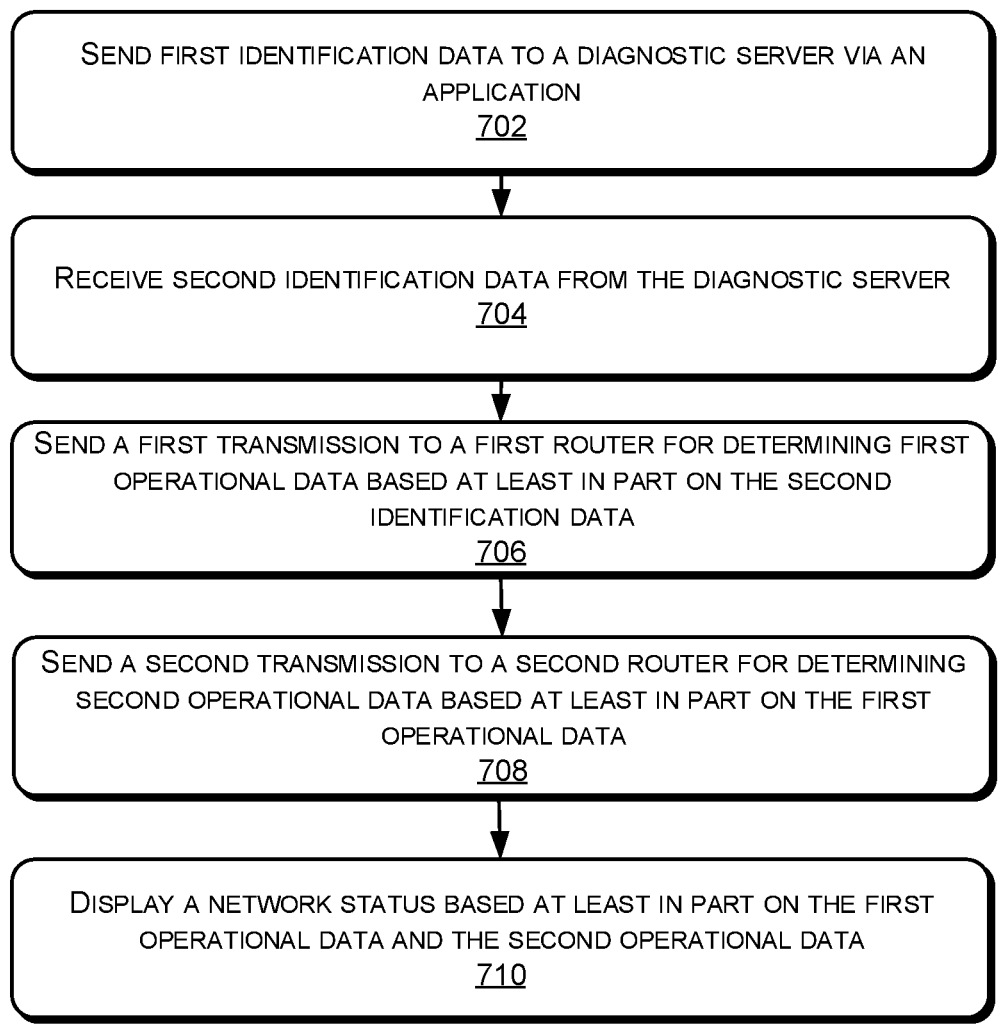
FIG. 7 is a flow diagram of an example process that includes determining a network status and displaying an indication of the network status via an application, according to some implementations.

FIG. 7 is a flow diagram of an example process 700 that includes determining a network status and displaying an indication of the network status via an application, according to some implementations. The process 700 may be performed by one or more computing devices, such as the computing devices described with regard to FIGS. 1-4.

At 702, the example process 700 may include sending first identification data to a diagnostic server via an application. For example, the application may send identification data (e.g., customer ID, phone number etc.) to the diagnostic server At 704, the example process 700 may include receiving second identification data from the diagnostic server. For example, the diagnostic server may send a number of IP addresses to the UE, via the application and/or carrier network, such that the application may ping the devices (e.g., routers, modems, etc.) associated with each IP addresses.

At 706, the example process 700 may include sending a first transmission to a first router for determining first operational data based at least in part on the second identification data. For example, the application and/or diagnostic server may ping a first router associated with a first IP address received from the diagnostic server. For example, the first router may be associated with an ISP that is located at a site that is "upstream" from a user's location. The application and/or diagnostic server may receive operational data from the first router (e.g., such as determining if the first router elicits a response to the ping) which, in turn, will inform the application and/or diagnostic server whether or not there is an outage located at the site caused by the first router.

At 708, the example process 700 may include sending a second transmission to a second router for determining second operational data based at least in part on the first operational data. For example, the application and/or diagnostic server may ping other routers after determining that the router upstream (e.g., the ISP router) is not the cause of an outage and/or drop in operational performance being experienced at the user's location. For example, the application and/or diagnostic server may ping a second router associated with a second IP address determined by the diagnostic server. For example, the second router may be located at a point-of-presence (POP) site that is at a user's location and is "downstream" from the first router (e.g., that is associated with the ISP). The application and/or diagnostic server may receive operational data from the second router (e.g., such as determining if the second router elicits a response to the ping) which, in turn, will inform the application and/or diagnostic server whether or not there is an outage located at the POP site caused by the second router.

At 710, the example process 700 may include displaying a network status based at least in part on the first operational data and the second operational data. For example, if the second router does elicit a response, the application and/or diagnostic server may inform the user (e.g., via a message, notification, and/or light indicator) that the second router is operating normally. In some cases, the application and/or diagnostic server may illustrate a "green light" notification to indicate that the second router is operating normally.

Figure 8:
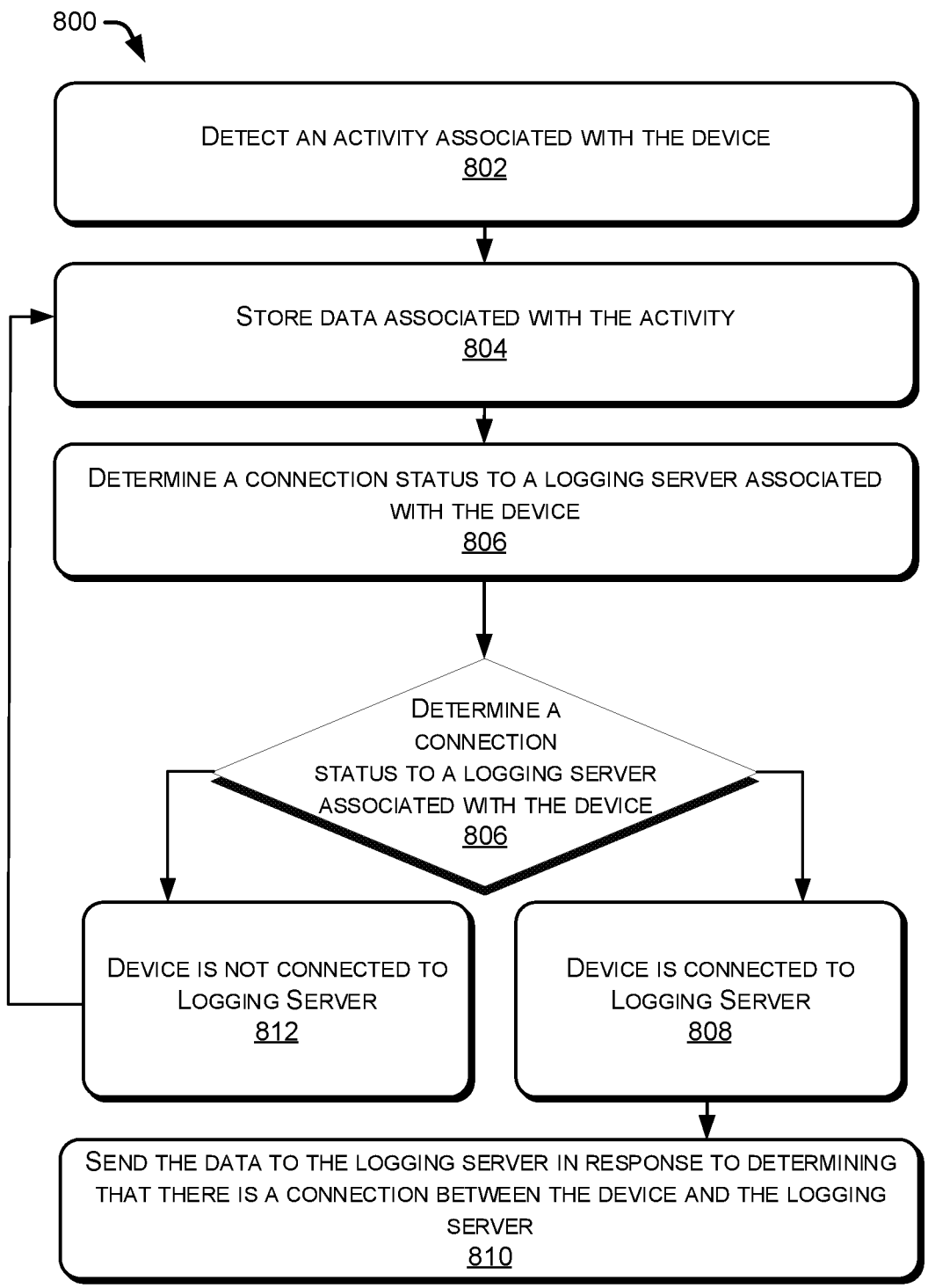
FIG. 8 is a flow diagram of an example process that includes determining a network status and storing data and/or transmitting data associated with the network status.

FIG. 8 is a flow diagram of an example process 800 that includes determining an activity status and providing an indication of the activity status to one or more logging servers, according to some implementations. The process 800 may be performed by one or more computing devices, such as the computing devices described with regard to FIGS. 1-4.

At 802, the example process 800 may include detecting an activity associated with the device. For example, a security component 436 may be configured to prevent a user from removing the server 404 from a connection to another device, such as a router and/or an ISP equipment. In some cases, the security component 436 may be coupled to a backup battery (not shown), a motion detector (e.g., gyroscope, accelerometer, etc.) (not shown), and/or a Wi-Fi chip (not shown) configured to determine if the server 404 has been moved (e.g., via the motion detector) and to operate using the back-up battery if unplugged. In some cases, the security component 436 may be configured to determine that the device has lost power and/or was disconnected from a power source. In some cases, the security component 436 may be configured to determine if the device has been disconnected from one or more ports, such as a Wi-Fi connection and/or an ethernet connection.

At 804, the example process 800 may include storing data associated with the activity. For example, the device may store data indicating that the device detected a motion event (e.g., that the device was moved), a power event (e.g., that the device was unplugged from a power source), and/or a connection event (e.g., the device was disconnected from one or more other devices (e.g., a router, switch, etc.). In some cases, if the device is unplugged form power, the device may continue to record the data by operating using a backup battery.

At 806, the example process 800 may include determining a connection status to a logging server associated with the device and at 808 and 810, the example process 800 may include determining that the device is connected to the logging server and sending the data to the logging server in response to determining that there is a connection between the device and the logging server. For example, the data collected by the device (e.g., a diagnostic server 306) (e.g., testing data, connectivity data, data associated with a motion event (e.g., that the device was moved), data associated with a power event (e.g., that the device was unplugged from a power source), data associated with a connection event (e.g., the device was disconnected from one or more other devices (e.g., a router, switch, etc.), etc.) may be sent to and stored by one or more logging server(s) 320. For example, the logging server(s) 320 may receive data from the device and the data thereby generating a historical record of network connectivity and/or network status for identified routers (e.g., the router 312) and/or ISP equipment (e.g. the ISP equipment 314). In some cases, the logging servers 320 may store data based on user information, such as name, address, IP address, phone number, etc. In some examples, the data stored in the logging servers 320 may be accessible by one or more users, such as users associated with the monitored devices, ISPs associated with the monitored devices, and/or third-party members who may have an interest in the stored data (e.g., teachers, employers, equipment manufacturers, etc.) such as the clients 310 and 316.

At 812, the example process 800 may include determining that the device is not connected to the logging server and the process 800 may proceed to step 804, in which the device may store data associated with the activity. For examples, the process 802-806 may include multiple iterations until connection between the device and the logging server is re-established.

The various techniques described above are assumed in the given examples to be implemented in the general context of computer-executable instructions or software, such as program components, that are stored in computer-readable storage and executed by the processor(s) of one or more computers or other devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
   one or more processors; and
   one or more memories storing instructions that, when executed by the one or more processors, perform acts including:
   receiving, from an application hosted on a user equipment, first identification data, the first identification data including customer identification data;
   responsive to sending the first identification data to a diagnostic server, receiving, from the diagnostic server, second identification data;
   sending, based at least in part on the second identification data, a first transmission to a first router for determining first operational data;
   sending, based at least in part on the first operational data, a second transmission to a second router for determining second operational data;
   analyzing a bandwidth associated with a wireless network; and
   displaying a network status based at least in part on the first operational data, the second operational data, and the bandwidth, wherein the network status is indicated by one or more status indicators.

2. The electronic device of claim 1, wherein the one or more status indicators include at least four lights and at least one first light of the four lights being green to indicate operational service, at least one second light of the four lights being yellow to indicate marginal operational service for video-conferencing and voice over internet protocol operations, and at least one third light of the four lights being red to indicate no operational service.

3. The electronic device of claim 1, wherein pinging at least one of the first router or the second router comprises being physically connected to at least one of the first router or the second router via a wired connection.

4. The electronic device of claim 1, wherein at least one of the first router or the second router is physically coupled to the electronic device and the acts further comprise power cycling at least one of the first router or the second router in response to determining a connectivity error.

5. The electronic device of claim 1, wherein the first router comprises an internet service provider (ISP) router located upstream from the second router.

6. The electronic device of claim 1, wherein the second router comprises a local router located at a point-of-presence (POP) site associated with the electronic device.

7. A non-transitory computer-readable media storing computer-executable instructions that, when executed, cause one or more processors of a computing device to perform acts comprising:
   sending first identification data to a diagnostic server via an application;
   receiving second identification data from the diagnostic server;
   sending, based at least in part on the second identification data, a first transmission to a first router for determining first operational data based at least in part on the second identification data;
   sending, based at least in part on the first operational data, a second transmission to a second router for determining second operational data based at least in part on the first operational data; and
   displaying a network status based at least in part on the first operational data and the second operational data.

8. The non-transitory computer-readable media of claim 7, wherein the application comprises a network testing application that pings at least one of the first router or the second router and reports and least one of the first operational data or the second operational data to the diagnostic server.

9. The non-transitory computer-readable media of claim 7, wherein the first router is associated with an ISP and the second router is associated with a wireless network local to the computing device.

10. The non-transitory computer-readable media of claim 7, wherein sending the second transmission to the second router includes pinging a LAN associated with the second router and a WAN associated with the second router.

11. The non-transitory computer-readable media of claim 10, further comprising:
 pinging the LAN in response to determining that the first router is operational; and
 pinging the WAN in response to determining that the LAN is operational.

12. The electronic device of claim 1, wherein the second identification data includes at least one of a customer identifier, an internet protocol (IP) address, a subnet mask, a gateway, a domain name system (DNS), or a Wi-Fi received signal strength indicator (RSSI) level.

13. The electronic device of claim 1, wherein the first identification data includes at least one of a cellular carrier's IP address, a subnet mask, gateway, RSSI, or a cellular carrier's name.

14. The electronic device of claim 1, wherein the acts further comprise determining that an RSSI level is below a threshold value and wherein displaying the network status is based at least in part on the RSSI level being below the threshold value.

15. The electronic device of claim 1, wherein the one or more status indicators include one or more lights to display a color:
 green to indicate the network status as operational;
 yellow to indicate the network status as marginal operational; or
 red to indicate the network status as non-operational.

16. The non-transitory computer-readable media of claim 7, wherein the computing device is physically connected to a router via a wired connection and sending a transmission to the router.

17. The non-transitory computer-readable media of claim 7, wherein the operations further comprise power cycling a router in response to determining a connectivity error.

18. The non-transitory computer-readable media of claim 7, wherein the operations further comprise sending a transmission to an internet service provider (ISP) router located upstream from the first computing device.

19. The non-transitory computer-readable media of claim 7, wherein the operations further comprise sending network status to a second computing device.

20. The non-transitory computer-readable media of claim 7, wherein the operations further comprise sending a transmission to a local router located at a point-of-presence (POP) site associated with the computing device.

* * * * *